April 29, 1941.   C. K. ROOS   2,239,860
METHOD OF MAKING PLASTIC PRODUCTS
Filed April 28, 1937
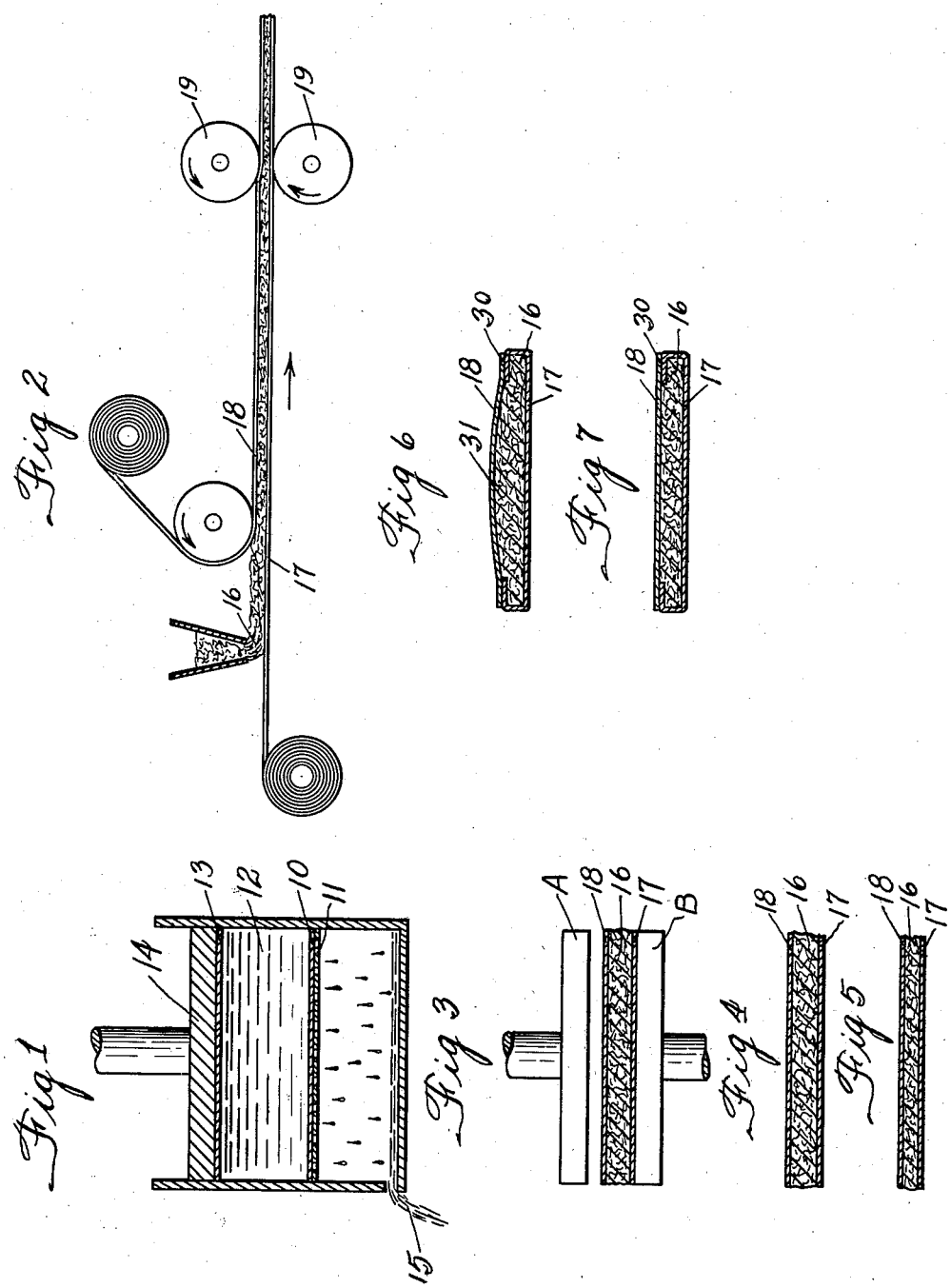
Inventor:
Carlisle K. Roos
By: Ames, Thiess, Olson, & Mecklenburger
Attys Patented Apr. 29, 1941

2,239,860

UNITED STATES PATENT OFFICE 2,239,860

METHOD OF MAKING PLASTIC PRODUCTS

Carlisle K. Roos, Wheaton, Ill., assignor to United States Gypsum Company, Chicago, Ill., a corporation of Illinois Application April 28, 1937, Serial No. 139,453

9 Claims. (Cl. 154—2)

The present invention relates to an improved form of plastic products and the method used for their production.

One of the objects of the present invention is to produce dense, strong, and tough gypsum products from a mixture of calcined gypsum and water, with or without added filling materials and such strengthening agents as fiber, wood fiber, comminuted paper, and the like, which products have been rendered dense, strong, and tough by the application of pressure thereto during their formation.

A further object of the invention is a process for the production of dense, strong, and tough gypsum products which comprises mixing calcined gypsum with water to form a plastic mixture and thereupon confining the said mixture between absorbent sheets of fabric and compressing the same, thereby expelling some of the excess water above that required for the setting of the gypsum into the fabric sheets and hence out of the plastic mass. These sheets may be allowed to remain in contact with the surface or surfaces of the pressed product, eventually becoming an integral part thereof as a result of the setting and drying of the gypsum core.

A further object of the invention is a process for the pressing of still unset plastic mixtures of calcined gypsum or the like containing the necessary water for the hydration and setting of the gypsum, this pressing being accomplished under conditions which are conducive to the removal of some of the excess water.

Still a further object of the invention is to produce strong, dense and tough compressed set gypsum products from plastic masses of calcined gypsum and water, with or without the addition of fibers or other strengthening agents, in which process some of the water exceeding that required for hydration is removed by pressure applied from two sides at least of the plastic material and through fibrous or other fabric sheets which define the limits of the plastic material and form an outer protective coating therefor.

Other objects of the invention will become apparent from the hereunto appended claims and the further description hereinbelow.

It is well known that calcium sulfate hemihydrate or other forms of calcined gypsum will unite with water to form calcium sulfate dihydrate, which then sets into a stone-like mass. The density and strength of this mass, however, is somewhat dependent upon the amount of water which was originally mixed with the calcined gypsum to form either a plastic mass or a flowable slurry. It has usually been found necessary to supply more water than is theoretically required to combine with the calcined gypsum, for otherwise the plastic mass would be too dry to permit of its being shaped, or else, in the case of casting, the material would not be sufficiently fluid to flow into molds. The strength of the resultant product is therefore considerably diminished because of the fact that when the excess water eventually escapes by evaporation, as when the product is dried, there will remain in the gypsum product innumerable interstices which naturally diminish the structural strength of the material.

While it has already been proposed to add various reinforcing materials and fillers to mixtures of calcined gypsum and water, as for example various types of fibers and fibrous fillers, and these to some extent increase the strength of the product because they act as a bonding agent which resists shattering, yet the overall strength of the material is diminished rather than enhanced by such admixture. On the contrary, as proposed in the present specification and in accordance with the present invention, a mixture of calcined gypsum, water and fibrous materials of various types is subjected to pressure sufficient to cause removal from the mixture of some of the excess water which has been mixed therewith to allow its initial shaping. The final product thus obtained will be dense, tough and strong, and far superior in this respect to products which have been allowed to set without the use of the present invention.

In its simplest form, the present invention can be carried into effect by making a mixture of calcined gypsum, water, and from 1% to 20% or more of fiber. This fiber may be finely divided wood fiber such as may be obtained by the grinding of old newspapers, wood pulp, and the like, or may be finely comminuted sawdust or fibrated wood. This mixture, which is preferably made in such proportions as constitute a plastic material, is provided on one or more sides with a liner or cover of a fibrous fabric, such for example as heavy paper or cardboard, whereupon the thus prepared object is subjected to pressure sufficient to cause the expulsion of water from the mass, which water enters the interstices of the fibrous fabric, by which it is absorbed, although it is also within contemplation of the invention to have this water pass through the fibrous material and to flow away from the other side thereof. Whether it does this or not depends entirely upon the amount of water originally added and also the pressure to which the material is subjected.

The present invention may be adapted to the manufacture of a large variety of products, which may consist of artificial lumber of various types. Thus studding and beams may be made, which are lined on both sides, or even on all four sides, with fibrous cover sheets—for example, paper, heavy cardboard, or woven textile fabrics. The invention is equally applicable to the manufacture of relatively large flat sheets such as may be employed as wallboard, plaster board, and the like, but it is to be distinctly understood that the present invention is not at all to be limited by the shape of the object produced thereby.

If desired, the plastic material may contain, in addition to the gypsum and water, suitable inorganic or organic bonding agents or adhesives such as starch, karaya gum, dextrin, farinaceous products, prepared starch pastes, or the like. In addition thereto, fibers may or may not be used, depending upon what it is desired to manufacture.

The pressure employed for carrying out the present invention may vary widely, depending upon the amount and kind of fiber used, the density or other characteristics of the material desired, the type of calcined gypsum employed, the amount of water which has been mixed therewith, the characteristics of the cover sheets, and the effect of various possible additive agents. Without in any way wishing to limit the invention, it may be said that the pressure may be varied from as little as 10 pounds per square inch to as much as 500 pounds per square inch and upward, the density of the final product depending upon the composition of the material as well as the pressure.

As shown herein, the invention is diagrammatically illustrated by a number of figures contained on the single sheet of drawings, in which Figure 1 is a diagrammatic elevational cross section illustrating the method of pressing a cementitious product by squeezing some of the water contained therein through fabric and a foraminous support by means of a suitable pressure plunger;

Fig. 2 is a diagrammatic illustration showing the formation and the slight compression of a cementitious board having fabric coverings;

Fig. 3 is a diagrammatic illustration of a board, made in accordance with the process of Fig. 2, just after it has been placed in the press and prior to the application of pressure thereto;

Fig. 4 is a cross-sectional view of a fragment of a plaster board having fabric coverings, being shown in the condition before application of pressure;

Fig. 5 is a cross-sectional view of the same fragment as shown in Fig. 4, but after compression;

Fig. 6 is a cross-sectional view of a board being made in accordance with Fig. 2, with the edges slightly compressed; and Fig. 7 shows the same in final condition and after compression.

It is to be understood that the drawing is purely diagrammatic and is not to be taken as a limitation of the present invention.

Let it be assumed, for example, that in accordance with the present invention it is desired to manufacture a flat surfaced block. This may be accomplished by first placing a sheet of fabric or cardboard 10, paper or the like into the bottom, and sides also if desired, of a foraminous mold 11. Upon this sheet there is placed a core composition 12 consisting of calcined gypsum—for example, ordinary stucco (calcium sulfate hemihydrate) mixed with 1% to 10% of a suitable fiber, a small percentage of farinaceous paste, and sufficient water to produce a plastic mass. On top of this mass there is placed a second sheet of fabric 13, which may be similar to the first sheet or more porous or less porous, whichever it is desired to use, whereupon pressure is applied by means of a suitable pressing platen 14. As a result of the pressure, some of the excess water contained in the mix is forced into and through the fabric sheets, thoroughly wetting the same and, if they are thick enough, being absorbed thereby. If sufficient pressure is used, considerable water 15 will pass through the fabric sheets, which act as filter means.

The thickness of the block is of course a matter of choice, and if the material is sufficiently thin there may eventuate a sheet that may, for example, be used as plaster board, wallboard, or the like. It is also obvious that the fabric sheets need not necessarily be perfectly smooth and flat but may be given almost any desired shape by using suitably recessed and engraved or otherwise ornamented pressing platens or pressing means, so that the manufacture of ornamental objects in accordance with the present invention is also possible and contemplated.

The process may also be adapted for the manufacture of large sheets of wallboard, plaster board, and the like, by proceeding first to manufacture, by means already well known, a paper or cardboard lined plaster board or wallboard on a continuous plaster-board machine which turns out a continuous length of plaster board by an operation which involves the placing of a suitable core material 16 upon an advancing sheet of cardboard or heavy paper 17 and the superimposition thereon of a second sheet of similar paper or cardboard 18, whereafter the thus formed board is passed through light pressure rollers 19 which, if desired, also serve to crimp the lower sheet about the edges to produce what is known as a folded edge board completely surrounded by paper on all four sides. If it is desired to apply the present invention to such an operation, it is advisable to press the edges 30 of the board during the initial formation to approximately the desired size but to leave the center portion 31 of the board a little thicker than it is desired to have it in the final product. (See Figs. 6 and 7, which show such a board before and after the final pressing.) Immediately after this board—which is being made on a continuous machine—has been formed it is cut by a traveling knife, and the freshly made but still unset sheet thus produced is then subjected to pressure by means of suitable pressing means such as the platens A and B of a hydraulic press. This pressing squeezes some of the excess water out of the core and into the fiber cover sheets. It is of course obvious that more than one sheet may be pressed at a time by employing a suitable multiplaten press.

If a still stronger product is desired, a special form of calcined gypsum having a low consistency may be employed. Thus the alpha gypsum described in Patent No. 1,901,051 may be substituted for ordinary calcined gypsum plaster. This alpha gypsum has a very low consistency, so that a much smaller amount of water may be used in producing a slurry therefrom. It is also possible to reduce the consistency of calcined gypsum plasters by the use of small amounts of a mixture of gum arabic and alkalis or lime, this method being applicable also to the just mentioned alpha gypsum.

In order to enhance the ease with which the water can be partly removed from the material during the pressing, the gauging water, or the mixture thereof with the calcium sulfate hemihydrate, with or without fillers, etc., may be heated to a temperature of from 100° F. to about 150° F.

It will of course be obvious that the calcium sulfate hemihydrate plasters employed in connection with the present invention may be admixed with the well-known set-modifying agents, such as accelerators and retarders, so that the time of set of the material may be accurately controlled. These accelerators may consist of ground calcium sulfate dihydrate, such as set plaster or natural gypsum rock, or chemically precipitated seed crystals, or of accelerating salts, while the retarder may consist of what is known as "commercial retarder," which is a composition derived by the treatment of glue, proteins or keratinaceous material with lime or any other known substance that will delay the setting of the particular plaster used. These retarders and accelerators may be present in suitably balanced amounts so as to produce a definite, predetermined setting period.

After the gypsum core has set, the board is put through a suitable drier in which the moisture still remaining in the board is caused to evaporate. This drying must be accomplished under conditions which prevent the recalcination of the gypsum core.

In order to insure a tight but strong bond between the core and the fiber cover sheets, suitable bonding agents such as gelatinized starch, karaya gum, or other adhesives may be added to the gypsum core.

Wallboard which has been made in accordance with the present invention is very strong and tough and far superior in strength to wallboard which is made by merely allowing the gypsum core therein to set under ordinary conditions.

While the invention has been described in connection with the manufacture of wallboard in blocks, it is obvious that other shapes can be produced, depending upon what it is desired to make. Thus studs, beams, and other architectural shapes may be made in accordance with the teachings of the present invention without departing therefrom. It is also obvious that, in addition to ordinary calcined gypsum, other forms of setting gypsum cements, such as Keene's cement, activated anhydrite plasters, and other equivalent substances may be substituted for the above mentioned gypsum products with somewhat similar results.

Obvious modifications of the present invention are to be considered within the scope thereof, for which is claimed:

1. The process of producing a hard, dense and strong gypsum wallboard and the like which comprises the steps of placing a mixture of calcined gypsum and water between two cover-sheets of paper, and applying sufficient pressure thereto to cause escape of excess water from the mixture through the sheets, said pressure being applied substantially over the entire area of the sheets at one time by mechanical means which force the gypsum crystals closer to each other, thereby increasing the density of the product.

2. The process of making dense, strong, paper-covered wallboard which comprises placing a mixture of calcined gypsum, paper-fiber and a farinaceous paste on a liner of paper, superimposing thereon a similar liner, folding the edges of one liner over the other about the mixture to enclose the same, compressing the mixture at and near the edges to substantially the desired final thickness of the board, and leaving the central portion of the board somewhat thicker, and later compressing the board, before the gypsum has set, to its final dimensions, thereby squeezing some of the excess water out of the mixture through the liners and allowing the thus formed article to set and harden, and then drying the same.

3. The process of producing a dense, strong gypsum board which comprises placing a warm core material containing unset wet calcined gypsum between liners of paper, and compressing the core with expulsion of some of the therein contained water through the paper before the material has set and become cold.

4. The process of forming a dense paper-covered plastic product which comprises confining an aqueous slurry of calcium sulfate hemihydrate between water-pervious cellulosic sheets, and, after the formation of calcium sulfate dihydrate crystals in the slurry, expelling excess water therefrom through the sheets by applying pressure to the sheets and to the thereby confined slurry over substantially the entire area of the sheets by mechanical means which causes the crystals to opproach closer to each other, thus minimizing voids in the product.

5. The process of forming a dense fabric-covered plastic product which comprises confining an aqueous slurry of a cementitious material between water-pervious webs of a fabric, and, after the formation of an initially set cement in the slurry, expelling excess water therefrom through the sheets by applying pressure to the sheets and to the thereby confined slurry over substantially the entire area of the sheets by mechanical means which causes the crystals to approach closer to each other, thus minimizing voids in the product.

6. The process of producing dense gypsum wallboards which comprises the step of compressing the still plastic gypsum core thereof prior to its final setting by non-resilient mechanical pressure applied over substantially the entire area of both sides of the board with sufficient force to expel therefrom excess water therein contained by forcing the water from the interstices of said core into and through the cover sheets.

7. The process of making a dense, strong, shock resistant building material which comprises confining a mixture of water and calcined gypsum between fibrous cover-sheets and applying nonresilient mechanical pressure to the mixture over substantially the entire area of the sheets by means of a platen at the same time with force sufficient to squeeze some of the excess water from the mixture, thereby consolidating the mixture and causing the therein formed hydrated gypsum crystals to be brought into closer proximity with each other.

8. The process of producing a dense, strong plaster or wallboard having paper liners which comprises first forming the usual plaster or wallboard having an unset gypsum core, and compressing the same, before the gypsum has finally set, by nonresilient mechanical means applied over the entire surface area of both sides of the board at one time with sufficient force to cause the confined core to become considerably reduced in thickness and to cause the gypsum crystals therein to be forced closer together while at the same time interstitial water is driven from the board through one or both of the paper cover sheets.

9. In the manufacture of paper-covered gypsum wallboard the novel step of mechanically compressing the board, prior to the final set of the gypsum core thereof, over the entire surface area of the cover sheets at one time by means of a platen with force sufficient to compress the board with simultaneous escape of interstitial water therefrom.

CARLISLE K. ROOS.